(12) United States Patent
Schlein

(10) Patent No.: US 10,731,861 B2
(45) Date of Patent: Aug. 4, 2020

(54) DUAL FUEL NOZZLE WITH CONCENTRIC FUEL PASSAGES FOR A GAS TURBINE ENGINE

(71) Applicant: United Technologies Corporation, Hartford, CT (US)

(72) Inventor: Barry C. Schlein, Wethersfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 316 days.

(21) Appl. No.: 14/546,721

(22) Filed: Nov. 18, 2014

(65) Prior Publication Data

US 2015/0253010 A1    Sep. 10, 2015

Related U.S. Application Data

(60) Provisional application No. 61/905,553, filed on Nov. 18, 2013.

(51) Int. Cl.
| | |
|---|---|
| *F23R 3/14* | (2006.01) |
| *F23R 3/30* | (2006.01) |
| *F23R 3/28* | (2006.01) |
| *F23R 3/36* | (2006.01) |
| *F23D 17/00* | (2006.01) |
| *F23C 7/00* | (2006.01) |

(52) U.S. Cl.
CPC .............. *F23R 3/286* (2013.01); *F23C 7/004* (2013.01); *F23D 17/002* (2013.01); *F23R 3/14* (2013.01); *F23R 3/30* (2013.01); *F23R 3/36* (2013.01); *Y02T 50/675* (2013.01)

(58) Field of Classification Search
CPC .... F23R 3/30; F23R 3/286; F23R 3/36; F23R 3/14; F23R 3/12; F23C 7/004; F23D 17/002
See application file for complete search history.

(56) References Cited

U.S. PATENT DOCUMENTS

| | | | |
|---|---|---|---|
| 4,168,803 A | 9/1979 | Simmons et al. | |
| 4,483,137 A * | 11/1984 | Faulkner | F02C 3/30 60/39.55 |
| 4,815,664 A * | 3/1989 | Tuthill | F23D 11/107 239/404 |
| 4,948,055 A | 8/1990 | Belcher et al. | |
| 4,977,740 A * | 12/1990 | Madden | F23D 17/002 239/424.5 |
| 5,086,979 A | 2/1992 | Koblish et al. | |
| 5,144,804 A | 9/1992 | Koblish et al. | |

(Continued)

*Primary Examiner* — Todd E Manahan
*Assistant Examiner* — Kyle Robert Thomas
(74) *Attorney, Agent, or Firm* — Getz Balich LLC

(57) ABSTRACT

A fuel nozzle is provided for a combustor of a gas turbine engine. The fuel nozzle includes an outer air swirler along an axis. The outer air swirler defines an outer annular air passage. An inner air swirler along the axis defines an annular fuel gas passage around the axis between the outer air swirler and the inner air swirler. An annular liquid passage is defined between the inner air swirler and an air inflow tube. A tube is within a housing to define an annular gas passage around the tube. The tube is operable to communicate a liquid into the annular liquid passage and the annular gas passage is operable to communicate a gas into the annular fuel gas passage.

18 Claims, 12 Drawing Sheets

(56) References Cited

U.S. PATENT DOCUMENTS

| | | | |
|---|---|---|---|
| 5,165,241 A * | 11/1992 | Joshi | F23R 3/14 60/737 |
| 5,167,116 A | 12/1992 | Koblish et al. | |
| 5,218,824 A | 6/1993 | Cederwall et al. | |
| 5,222,357 A | 6/1993 | Eddy et al. | |
| 5,255,505 A | 10/1993 | Cloyd et al. | |
| 5,295,352 A | 3/1994 | Beebe | |
| 5,355,670 A | 10/1994 | Sciocchetti | |
| 5,361,578 A | 11/1994 | Donlan | |
| 5,408,825 A | 4/1995 | Foss et al. | |
| 5,408,830 A | 4/1995 | Lovett | |
| 5,423,173 A | 6/1995 | Lemon et al. | |
| 5,426,933 A * | 6/1995 | Maden | F23C 7/004 60/39.55 |
| 5,461,865 A | 10/1995 | Snyder et al. | |
| 5,505,045 A * | 4/1996 | Lee | F23D 11/107 239/424 |
| 5,564,271 A | 10/1996 | Butler et al. | |
| 5,713,205 A | 2/1998 | Sciocchetti et al. | |
| 5,720,164 A | 2/1998 | Corbett et al. | |
| 5,826,423 A * | 10/1998 | Lockyer | F23C 7/008 239/419.3 |
| 5,833,141 A | 11/1998 | Bechtel, II et al. | |
| 6,021,635 A | 2/2000 | Gaag et al. | |
| 6,367,239 B1 | 4/2002 | Brown et al. | |
| 6,434,945 B1 | 8/2002 | Mandai et al. | |
| 6,460,344 B1 | 10/2002 | Steinthorsson et al. | |
| 6,560,964 B2 | 5/2003 | Steinhorsson et al. | |
| 6,640,548 B2 | 11/2003 | Brushwood et al. | |
| 6,662,565 B2 | 12/2003 | Brundish et al. | |
| 6,715,292 B1 | 4/2004 | Hoke | |
| 6,883,332 B2 | 4/2005 | Steinthorsson et al. | |
| 7,000,403 B2 | 2/2006 | Henriquez et al. | |
| 7,007,864 B2 | 3/2006 | Snyder et al. | |
| 7,104,070 B2 | 9/2006 | Iasillo et al. | |
| 7,377,036 B2 | 5/2008 | Johnson et al. | |
| 7,703,287 B2 | 4/2010 | Haggerty et al. | |
| 7,908,863 B2 | 3/2011 | Hessler | |
| 8,418,469 B2 | 4/2013 | Myers et al. | |
| 8,448,441 B2 | 5/2013 | Nyberg et al. | |
| 2007/0003897 A1* | 1/2007 | Koizumi | F23R 3/28 431/354 |
| 2007/0137207 A1* | 6/2007 | Mancini | F23R 3/14 60/737 |
| 2008/0098737 A1* | 5/2008 | Haggerty | F02C 7/22 60/740 |
| 2009/0049838 A1* | 2/2009 | Oskin | F23R 3/14 60/734 |
| 2009/0224080 A1* | 9/2009 | Chew | F23D 11/107 239/589 |
| 2010/0263383 A1* | 10/2010 | York | F23R 3/14 60/748 |
| 2012/0234013 A1* | 9/2012 | Overman | F23R 3/343 60/772 |
| 2013/0074506 A1* | 3/2013 | Kock | F23R 3/343 60/746 |
| 2013/0086910 A1* | 4/2013 | Khan | F23R 3/14 60/737 |
| 2013/0263605 A1* | 10/2013 | Baruah | F23R 3/12 60/772 |

* cited by examiner

DUAL FUEL NOZZLE WITH CONCENTRIC FUEL PASSAGES FOR A GAS TURBINE ENGINE

CROSS-REFERENCE TO RELATED APPLICATION

This application claims priority to U.S. Provisional Application Ser. No. 61/905,553 filed Nov. 18, 2013, which is hereby incorporated herein by reference in its entirety.

BACKGROUND

The present disclosure relates to a gas turbine engine and, more particularly, to fuel nozzles with passages for both a liquid and a gas.

Gas turbine engines, such as Industrial Gas Turbines utilized in power production, mechanical drives as well as aero engines in commercial and military aircraft, include a compressor section to pressurize airflow, a combustor section to burn a hydrocarbon fuel in the presence of the pressurized air, and a turbine section to extract energy from the resultant combustion gases.

The combustor section includes a multiple of circumferentially distributed fuel nozzles that project into a forward section of a combustion chamber to supply fuel to mix with the pressurized airflow. The fuel nozzles may simultaneously utilize different types and combinations of fuel such as Jet-A, diesel, JP8, natural gas and others. Further, to facilitate lower NOx emissions, water may be injected though the nozzle as well.

Conventional dual fuel nozzles for aeroderivative industrial gas turbines employ separate passages for a gas and a liquid fuel. Aeroderivative industrial gas turbines are often designed to be as common as possible with the aero version to reduce cost. The fuel nozzle, however, is typically substantially different as industrial engines operate with both natural gas and liquid fuels, as well as combustor water injection. This may increase the size of the fuel nozzle and drive costly redesign of the combustor and diffuser case.

SUMMARY

A fuel nozzle for a combustor of a gas turbine engine, according to one disclosed non-limiting embodiment of the present disclosure, includes an outer air swirler along an axis. The outer air swirler defines an outer annular air passage. An inner air swirler is along the axis to define an annular fuel gas passage around the axis between the outer air swirler and the inner air swirler. An annular liquid passage is defined between the inner air swirler and an air inflow tube. A tube is within a housing to define an annular gas passage around the tube. The tube is operable to communicate a liquid into the annular liquid passage and the annular gas passage is operable to communicate a gas into the annular fuel gas passage.

In a further embodiment of the present disclosure, the annular fuel gas passage includes a multiple of exits.

In a further embodiment of any of the foregoing embodiments of the present disclosure, the multiple of exits are generally parallel to the axis.

In a further embodiment of any of the foregoing embodiments of the present disclosure, the multiple of exits are radially directed with respect to the axis.

In a further embodiment of any of the foregoing embodiments of the present disclosure, the multiple of exits are transverse directed with respect to the axis.

In a further embodiment of any of the foregoing embodiments of the present disclosure, the multiple of exits are located through a ramped portion of the inner wall.

In a further embodiment of any of the foregoing embodiments of the present disclosure, the air inflow tube defines a central air passage.

In a further embodiment of any of the foregoing embodiments of the present disclosure, a helical inflow vane is included within the air inflow tube.

A fuel nozzle for a combustor of a gas turbine engine, according to another disclosed non-limiting embodiment of the present disclosure, includes an outer air swirler along an axis. The outer air swirler defines an outer annular air passage. An inner air swirler is along the axis to define an annular fuel gas passage around the axis between the outer air swirler and the inner air swirler. An annular liquid passage is between the inner air swirler and an air inflow tube. The annular fuel gas passage includes a multiple of exits.

In a further embodiment of any of the foregoing embodiments of the present disclosure, a tube is included within a housing to define an annular gas passage around the tube. The tube is operable to communicate a liquid into the annular liquid passage and the annular gas passage is operable to communicate a gas into the annular fuel gas passage.

In a further embodiment of any of the foregoing embodiments of the present disclosure, the multiple of exits are generally parallel to the axis.

In a further embodiment of any of the foregoing embodiments of the present disclosure, the multiple of exits are radially directed with respect to the axis.

In a further embodiment of any of the foregoing embodiments of the present disclosure, the multiple of exits are transverse directed with respect to the axis.

In a further embodiment of any of the foregoing embodiments of the present disclosure, the multiple of exits are located through a ramped portion of the inner wall.

A method of directing a fuel gas and a liquid through a fuel nozzle and into a combustor of a gas turbine engine, according to another disclosed non-limiting embodiment of the present disclosure, includes directing an airflow through an outer annular air passage around an axis; directing the fuel gas through an annular fuel gas passage around the axis and radially within the outer annular air passage; and directing the liquid though an annular liquid passage around the axis and radially within the annular fuel gas passage.

In a further embodiment of any of the foregoing embodiments of the present disclosure, the method includes directing the fuel gas through a multiple of exits generally parallel to the axis.

In a further embodiment of any of the foregoing embodiments of the present disclosure, the method includes directing the fuel gas through a multiple of exits generally perpendicular to the axis.

In a further embodiment of any of the foregoing embodiments of the present disclosure, the method includes directing the fuel gas through a multiple of exits generally transverse to the axis.

In a further embodiment of any of the foregoing embodiments of the present disclosure, the method includes directing an airflow through a central passage radially within the annular liquid passage; and swirling the airflow within the central passage.

In a further embodiment of any of the foregoing embodiments of the present disclosure, the method includes directing the liquid into the annular liquid passage though a tube shielded by a gas in communication with the annular fuel gas passage The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment(s). The drawings that accompany the detailed description can be briefly described as follows.

DETAILED DESCRIPTION

Figure 1:
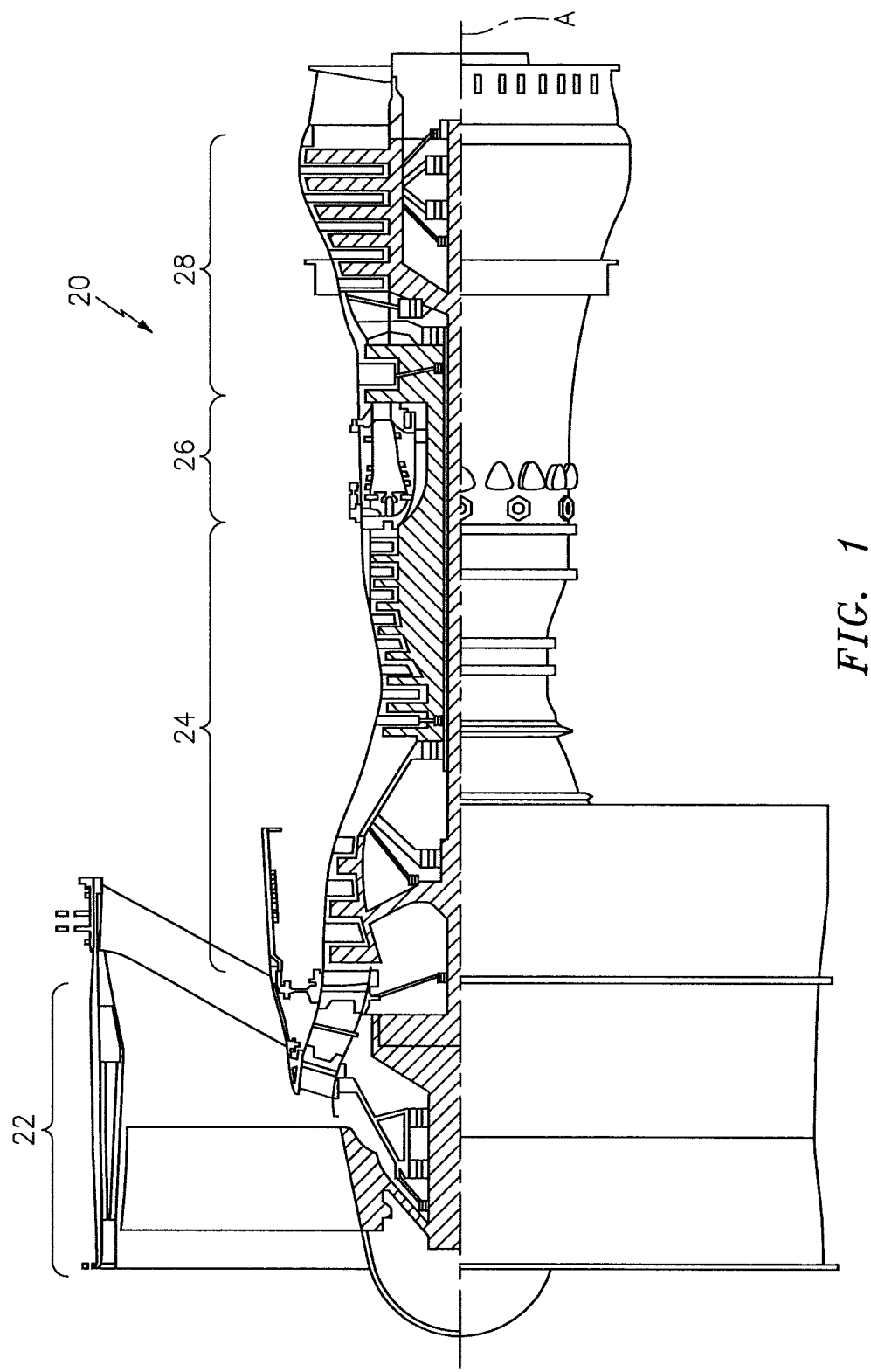
FIG. 1 is a schematic cross-section of an aircraft gas turbine (turbo fan) engine.
Figure 2:
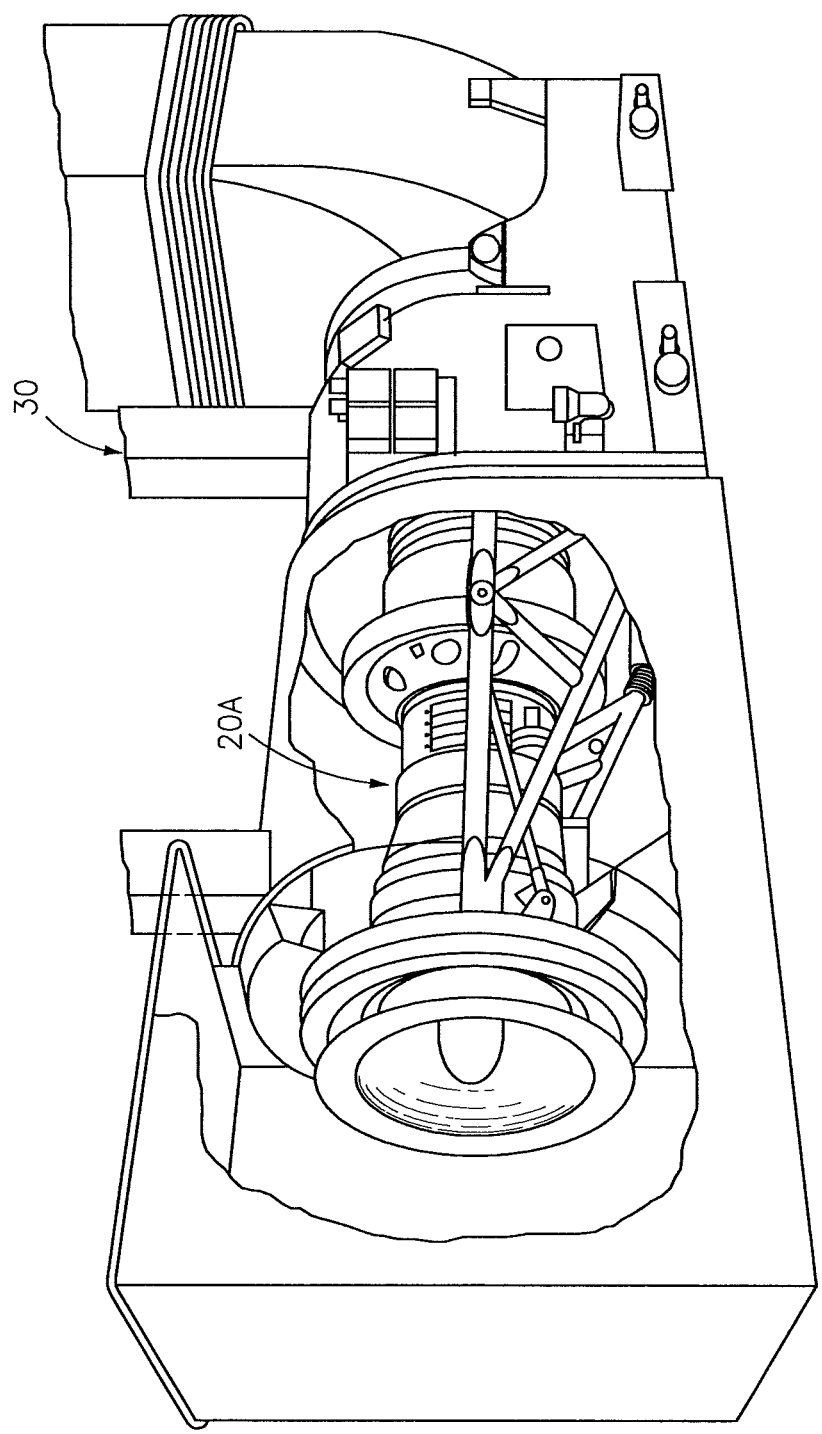
FIG. 2 is a perspective cross-section of an aero-derivative gas turbine engine in enclosure with fan section removed.

FIG. 1 schematically illustrates a gas turbine engine 20. The gas turbine engine 20 is disclosed herein as a two-spool turbo fan that generally includes a fan section 22, a compressor section 24, a combustor section 26 and a turbine section 28. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans with an intermediate spool. Still other aeroderivative engine architectures 20A are located within an enclosure 30 (see FIG. 2) typical of an industrial gas turbine (IGT) in which there is no fan section, and hot gases that exit the low pressure turbine flow into a power turbine to extract work.

Figure 3:
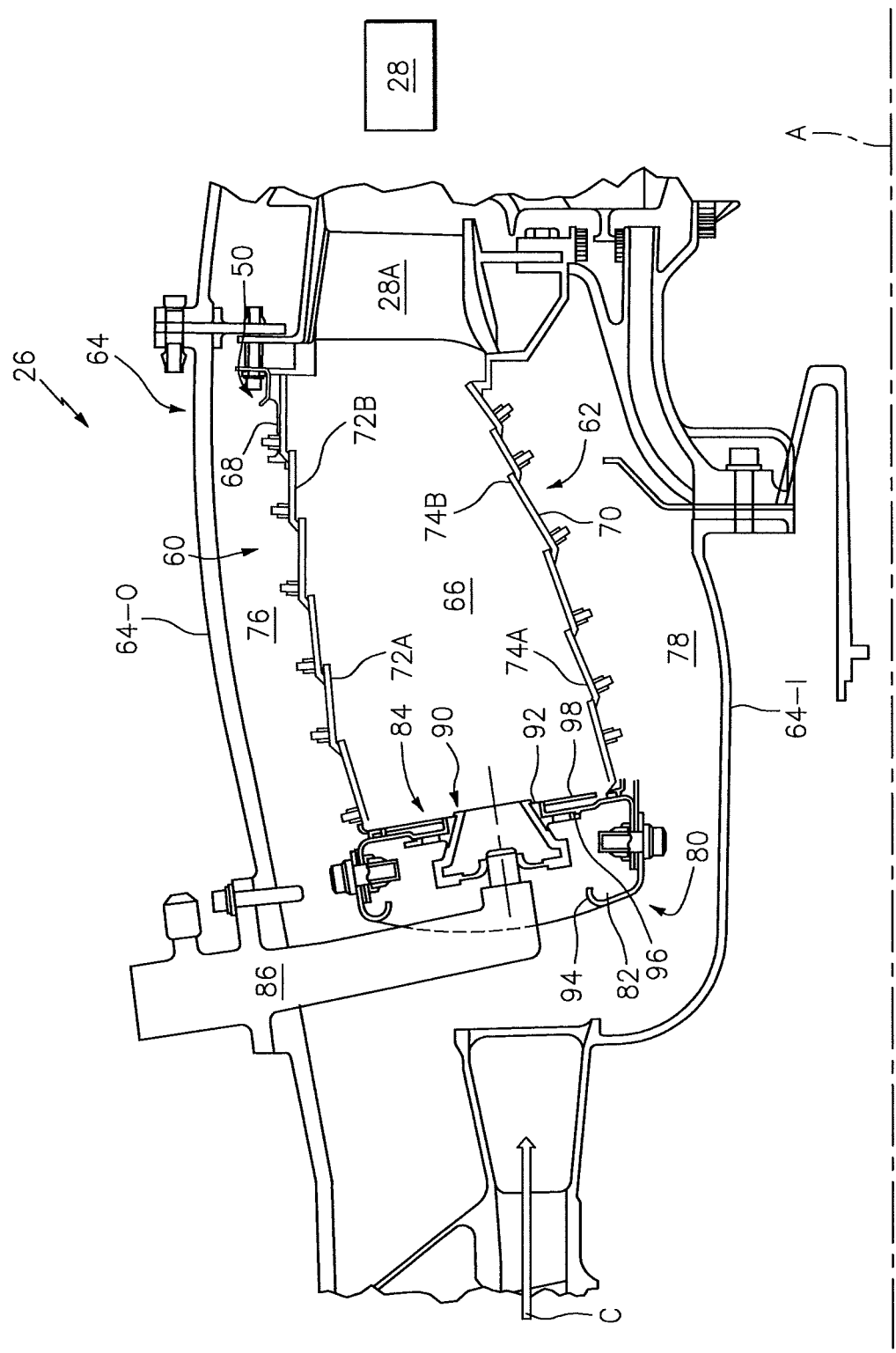
FIG. 3 is an expanded longitudinal schematic sectional view of a combustor section according to one non-limiting embodiment.

With reference to FIG. 3, the combustor section 26 generally includes a combustor 50 with an outer combustor wall assembly 60, an inner combustor wall assembly 62 and a diffuser case 64. The outer combustor wall assembly 60 and the inner combustor wall assembly 62 are spaced apart such that a combustion chamber 66 is defined therebetween. The combustion chamber 66 may be generally annular in shape. Other combustors may include a number of individual cans.

The outer combustor liner assembly 60 is spaced radially inward from an outer diffuser case 64-0 of the diffuser case module 64 to define an outer annular plenum 76. The inner combustor liner assembly 62 is spaced radially outward from an inner diffuser case 64-1 of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted to a hot side of the respective support shell 68, 70. Each of the liner panels 72, 74 may be generally rectilinear and manufactured of, for example, a nickel based super alloy, ceramic or other temperature resistant material and are arranged to form a liner array. In one disclosed non-limiting embodiment, the liner array includes a multiple of forward liner panels 72A and a multiple of aft liner panels 72B that are circumferentially staggered to line the hot side of the outer shell 68. A multiple of forward liner panels 74A and a multiple of aft liner panels 74B are circumferentially staggered to line the hot side of the inner shell 70.

The combustor 50 further includes a forward assembly 80 immediately downstream of the compressor section 24 to receive compressed airflow therefrom. The forward assembly 80 generally includes an annular hood 82 and a bulkhead assembly 84 which locate a multiple of fuel nozzles 86 (one shown) and a multiple of swirlers 90 (one shown). Each of the swirlers 90 is mounted within an opening 92 of the bulkhead assembly 84 to be circumferentially aligned with one of a multiple of annular hood ports 94. Each bulkhead assembly 84 generally includes a bulkhead support shell 96 secured to the combustor wall assembly 60, 62, and a multiple of circumferentially distributed bulkhead liner panels 98 secured to the bulkhead support shell 96.

The annular hood 82 extends radially between, and is secured to, the forwardmost ends of the combustor wall assemblies 60, 62. The annular hood 82 forms the multiple of circumferentially distributed hood ports 94 that accommodate the respective fuel nozzle 86 and introduce air into the forward end of the combustion chamber 66. Each fuel nozzle 86 may be secured to the diffuser case module 64 and project through one of the hood ports 94 and the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 28A. The NGVs 28A are static engine components which direct the combustion gases onto the turbine blades in the turbine section 28 to facilitate the conversion of pressure energy into kinetic energy. The combustion gases are also accelerated by the NGVs 28A because of their convergent shape and are typically given a "spin" or a "swirl" in the direction of turbine rotation.

Figure 4:
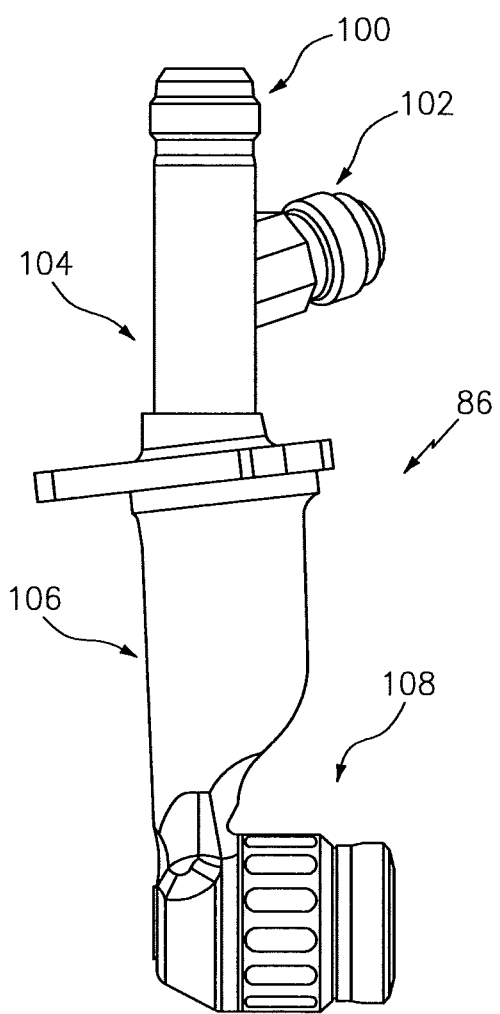
FIG. 4 is an isometric view of a fuel injector.

With reference to FIG. 4, each fuel injector 86 generally includes a first inlet 100 and a second inlet 102 defined by an inlet housing 104, a support housing 106 and a nozzle assembly 108. The first inlet 100 is transverse to the second inlet 102. The inlet housing 104 is received within the support housing 106 and a tube 110 extends through the housings 104, 106 (see FIG. 5).

Figure 5:
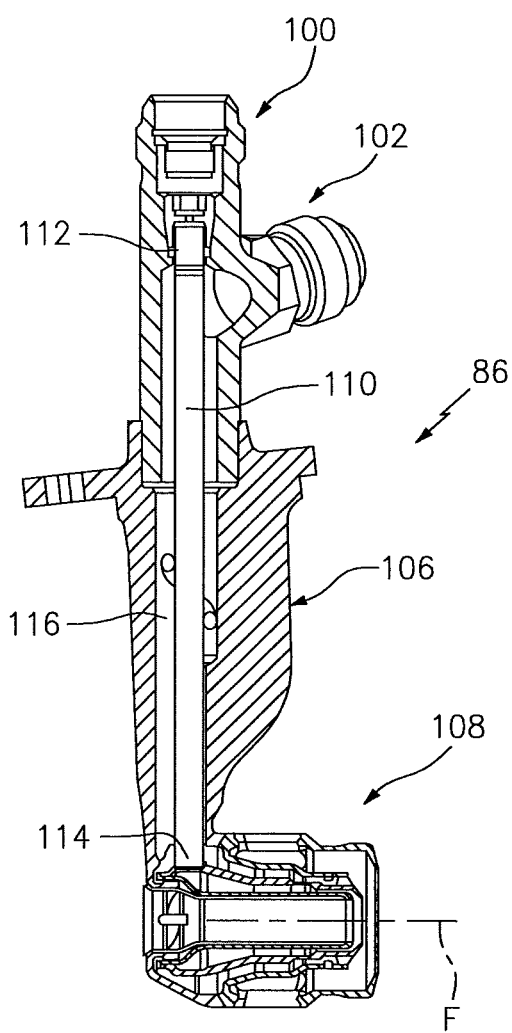
FIG. 5 is a sectional view of the fuel injector of FIG. 4.

With reference to FIG. 5, the first inlet 100 may receive a first fluid such as a liquid and the second inlet 102 may receive a second fluid such that the gas fluid acts as an insulator between the external hot air and the liquid fuel. The fuel injector 86 in the disclosed non-limiting embodiment provides concentric passages for a liquid such as Jet-A, diesel, JP8, water and combinations thereof as well as a gas such as natural gas. Each of the fuels are communicated through separate concentric passages within the fuel injector 86 such that gas turbine engine 20 readily operates on either fuel or combinations thereof.

The tube 110 separates the liquid from the gas. The tube 110 is secured within the inlet housing 104 with a seal such as an O-ring at one end section 112 and at the opposite end section 114 in the nozzle assembly 108 via a braze, weld, thread or other attachment. The tube 110 defines an annular gas passage 116 within the housings 104, 106 that operates as a heat shield to minimize or prevent coking of the liquid through the tube 110. That is, the annular gas passage 116 performs the function of the heat shield in the aero engine nozzle and protects the liquid fuel from hot gases and prevents the breakdown of the liquid fuel and the potential consequent fuel nozzle plugging. As the annular gas passage 116 performs two functions, the envelop of the fuel nozzle is not increased. That is, the aero derivative fuel nozzle (see FIG. 2) can be the same size as the aero engine (see FIG. 1), so the diffuser case and combustor need not be modified.

Figure 6:
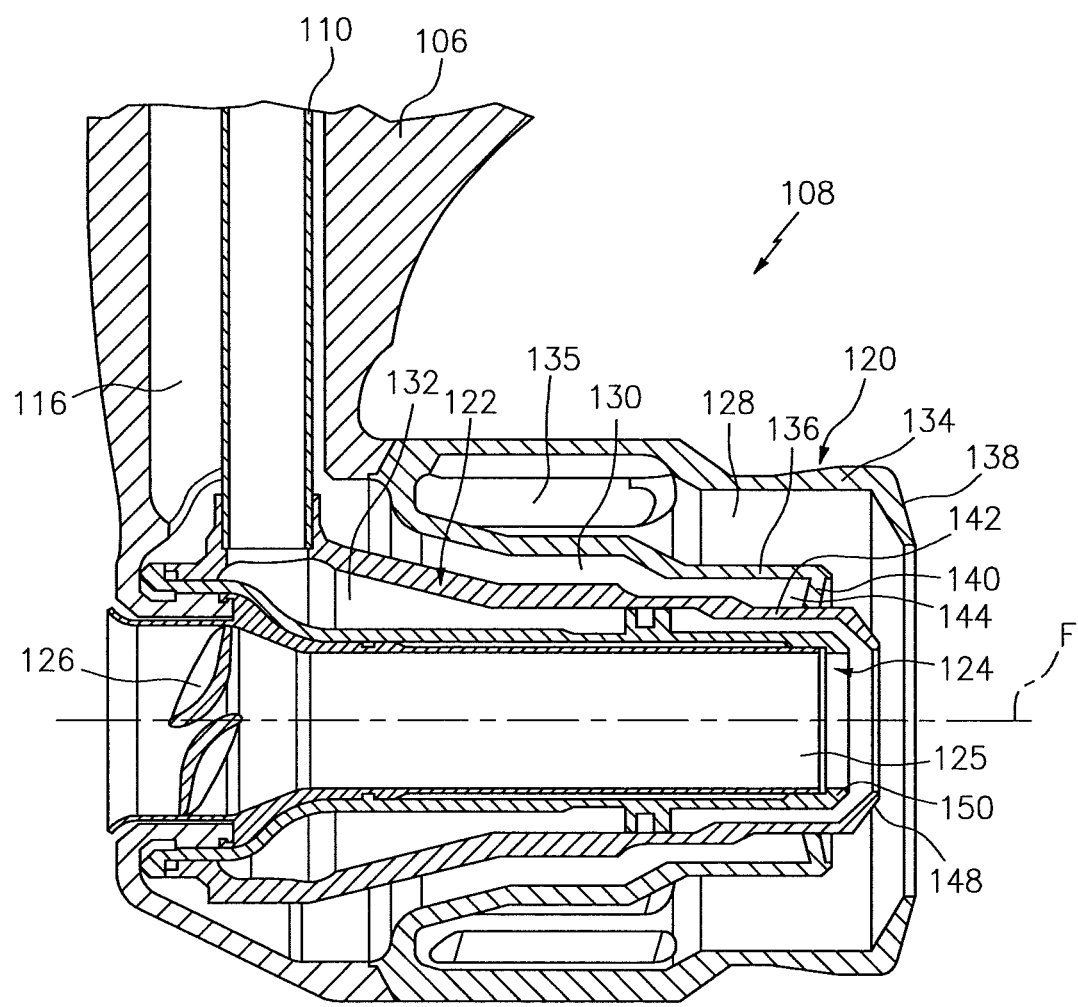
FIG. 6 is an expanded sectional view of a fuel nozzle.

With reference to FIG. 6, the nozzle assembly 108 is at least partially received within the swirler 90 (see FIG. 3) and generally includes a radial outer air swirler 120, an inner air swirler 122 and a central air passage 125 within which is located helical inflow vanes 126 along a nozzle axis F. Air enters an outer annular air passage 128 through a multiple of axial slots 135. The swirling air then turns and flows axially in the outer annular air passage 128. An annular fuel gas passage 130 is defined around axis F and between an inner wall 136 of the outer air swirler 120 and an outer wall 142 of the inner air swirler 122. The annular fuel gas passage 130 receives the fuel gas from within the annular gas passage 116 around the tube 110.

An annular liquid passage 132 is defined around axis F between the inner air swirler 122 and the air inflow tube 124. That is, the annular liquid passage 132 is between the outer wall 142 of the inner air swirler 122 and the air inflow tube 124. The annular liquid passage 132 receives the liquid from within the tube 110. A central air passage 125 is defined along axis F within the air inflow tube 124. The outer annular air passage 128 is defined between an outer wall 134 and an inner wall 136 of the outer air swirler 120. An end section 138 of the outer wall 134 and an end section 140 of the inner wall 136 may be turned radially inward toward axis F to direct the airflow at least partially radially inward. The outer wall 134 of the outer air swirler 120 includes the multiple of axial slots 135 which receive airflow therethrough. It should be appreciated that various geometries outer air swirler 120 will benefit herefrom.

Figure 7:
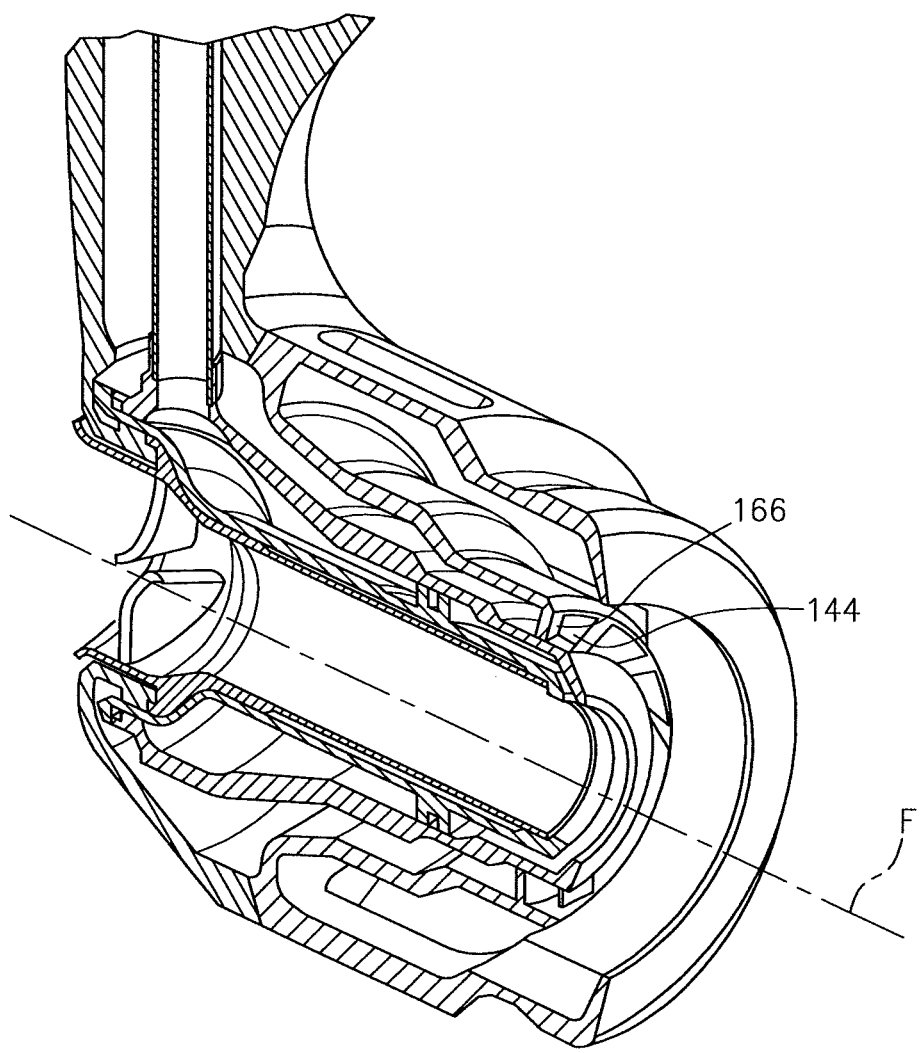
FIG. 7 is a perspective sectional view of the fuel nozzle.

In one disclosed non-limiting embodiment, the end section 140 of the inner wall 136 abuts an outer wall 142 of the inner air swirler 122 to defines a multiple of exits 144 (best seen in FIG. 7) to form an axial swirled exit for the annular fuel gas passage 130. That is, the annular fuel gas passage 130 terminates with the multiple of exits 144 that extend generally parallel with respect to the axis F.

Figure 8:
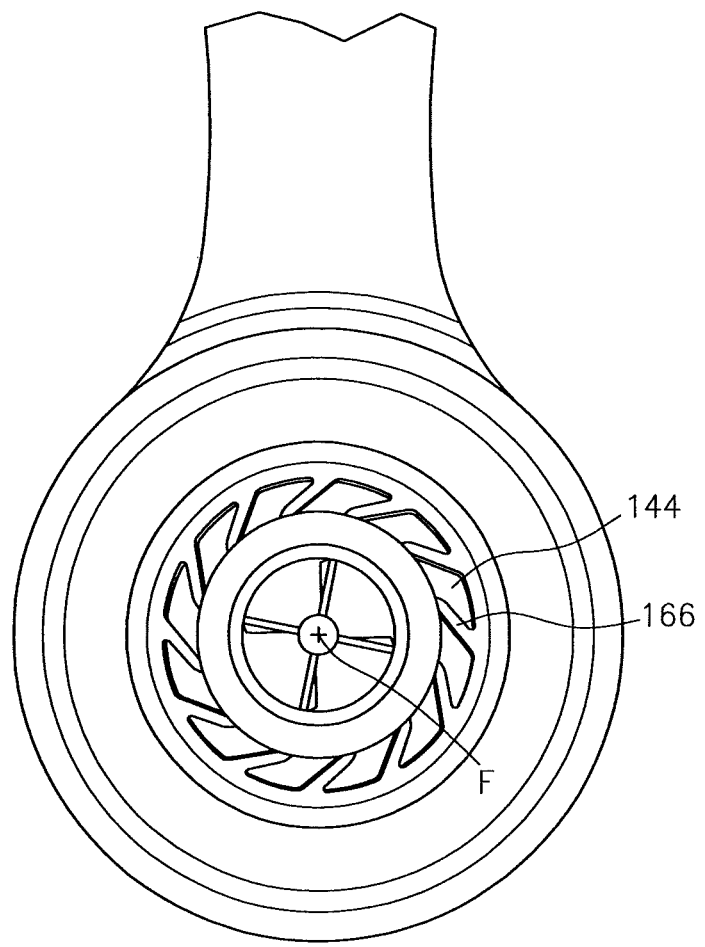
FIG. 8 is an expanded front view of the fuel nozzle.

The annular fuel gas passage 130 communicates essentially all, e.g., about one hundred (100) percent of the fuel gas through the multiple of exits 144. The multiple of exits 144 direct the gas axially and may impart a swirl thereto. Each of the multiple of exits 144 in the disclosed non-limiting embodiment are skewed quadrilaterals in shape (best seen in FIG. 8). In one disclosed non-limiting embodiment, the multiple of exits 144 are skewed at an angle α (see FIG. 9) between about fifty-sixty (50-60) degrees around the axis F such that the exits 144 are generally parallel to the axis F (see FIG. 10). In this disclosed non-limiting embodiment, the angle is typically greater than an angle of swirl of either of the surrounding air streams.

The outer wall 142 and the inner wall 146 of the inner air swirler 122 define the annular liquid passage 132. An end section 148 of the outer wall 142 and an end section 150 of the inner wall 146 may be turned radially inward toward axis F to direct the liquid at least partially radially inward. The air inflow tube 124 is mounted within the inner wall 146 and includes the upstream helical inflow vane 126 to swirl the airflow therethrough.

The air inflow tube 124 is mounted within the inner wall 146 and includes the upstream helical inflow vane 126 to swirl the airflow therethrough. Due in part to the swirled airflow through the air inflow tube 124, the liquid spray expands from the annular liquid passage 132 and impacts upon the filing region R to re-film/re-atomize. The increased liquid injection recession causes large drops to re-film/re-atomization on larger wall surface, resulting smaller drop size and higher penetration which increasing water vaporization rate as well as positioning water in desirable location. The reduced water drop size and the effective utilization of water facilitates a decrease in NOx emissions with reduced water injection (e.g., lower water-to-fuel ratio).

Figure 9:
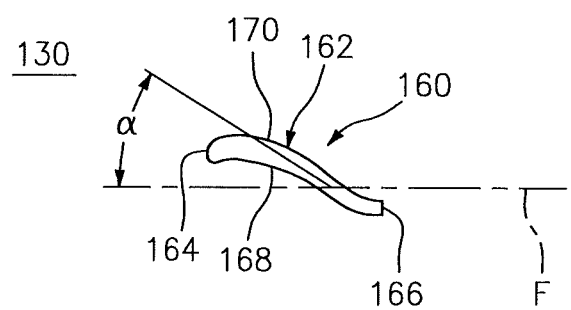
FIG. 9 is a schematic radially inward looking view of a vane for the fuel nozzle according to one disclosed non-limiting embodiment.
Figure 10:
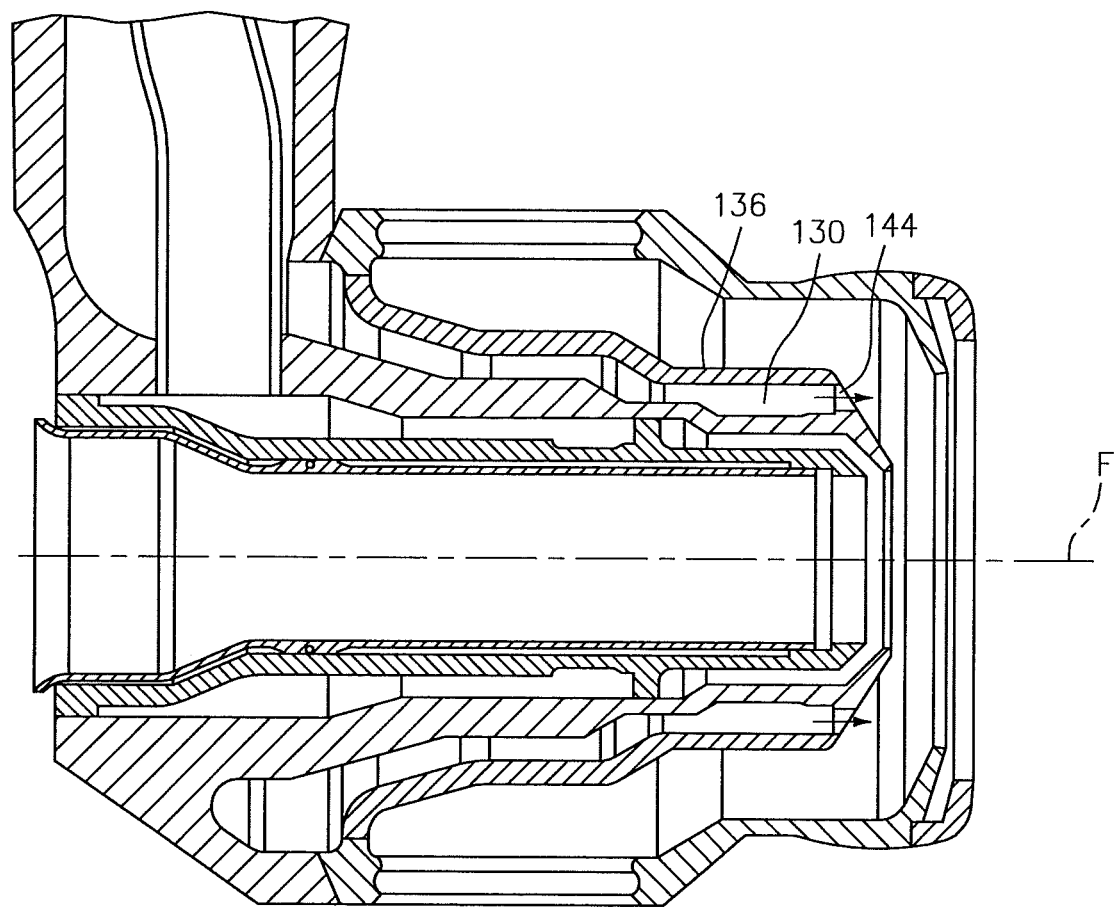
FIG. 10 is a perspective sectional view of a fuel nozzle according to another non-limiting embodiment.

With reference to FIG. 9, each of the multiple of exits 144 is at least partially defined by a vane 160 within the annular fuel gas passage 130. Each vane 160 is defined by an airfoil wall surface 162 between a leading edge 164 and a trailing edge 166 to define a generally concave shaped portion to form a pressure side 168 and a generally convex shaped portion forming a suction side 170. Each vane 160 is angled with respect to the axis F at the aforementioned angle α of about fifty to sixty (50-60) degrees such that the trailing edge 166 thereof, the outer air swirler 120 and the inner air swirler 122 from the skewed quadrilateral exits of the exits 144 (see FIG. 8).

Figure 11:
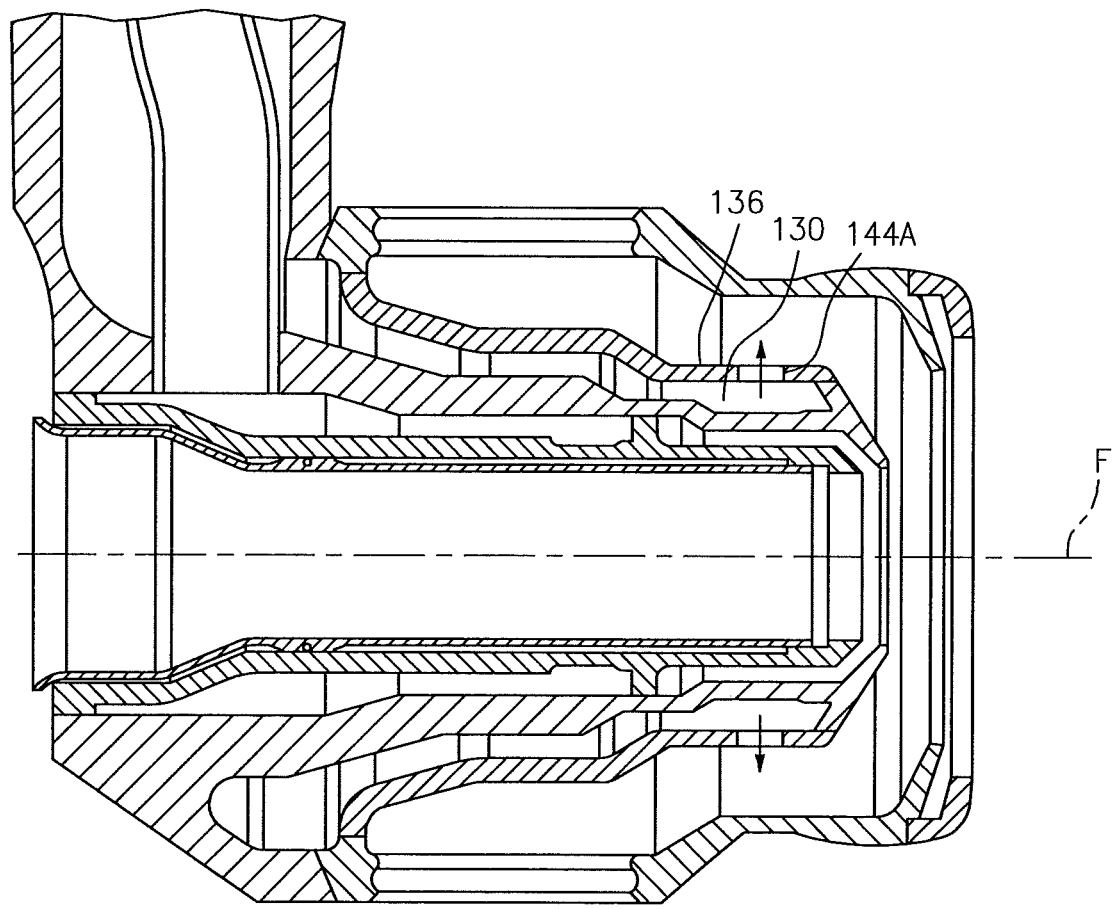
FIG. 11 is a perspective sectional view of a fuel nozzle according to another non-limiting embodiment.

With reference to FIG. 11, in another disclosed non-limiting embodiment, the exits 144A are directed radially through the inner wall 136 from the annular fuel gas passage 130. That is, the exits 144A extend radially with respect to the axis F.

Figure 12:
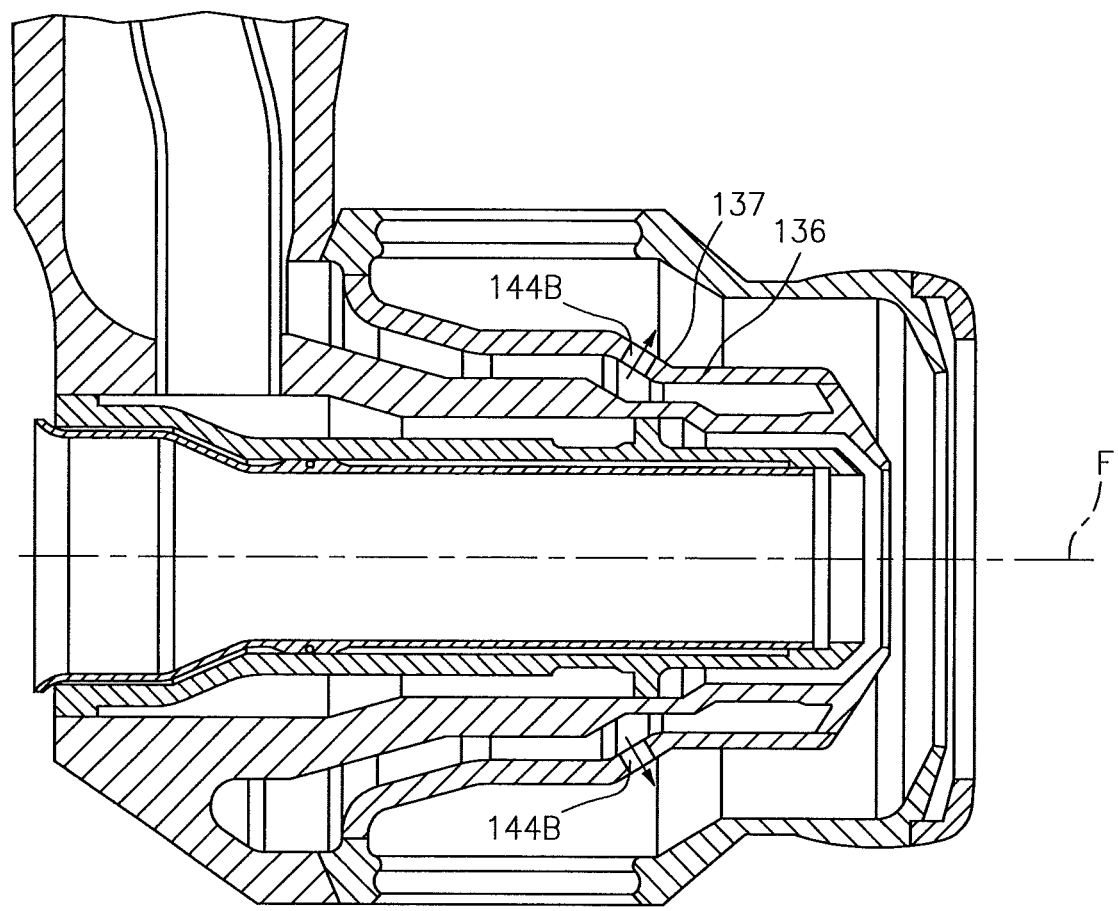
FIG. 12 is a perspective sectional view of a fuel nozzle according to another non-limiting embodiment.

With reference to FIG. 12, in another disclosed non-limiting embodiment, the exits 144B are directed transverse through the inner wall 136 from the annular fuel gas passage 130. That is, the exits 144 extend though a ramped portion 137 of the inner wall 136 at an angle with respect to the axis F. It should be appreciated that various combinations of exits 144, 144A and/or 144B may benefit herefrom.

The multiple of exits 144 decrease the injection area and increase swirl momentum to increase circumferential uniformity, total air swirl due to the angle of gas injection and increase air stream mixing downstream of nozzle to facilitate fuel-air mixing. Further, industrial gas turbine fuel nozzles have the same envelop as the aero fuel nozzle such that increased part commonality is provided between industrial and aero version of the engine combustor and diffuser cases.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A fuel nozzle for a combustor of a gas turbine engine, comprising:
    an outer air swirler along an axis, the outer air swirler defines an outer annular air passage;
    an inner air swirler along the axis to define an annular fuel gas passage around the axis, the annular fuel gas passage further defined, at least in part, by a surface of a radially innermost wall of the outer air swirler and a surface of a radially outermost wall of the inner air swirler, wherein an annular liquid passage around the axis is defined, at least in part, by another surface of the radially outermost wall of the inner air swirler and an air inflow tube; and
    a tube within a housing to define an annular gas passage around the tube, the tube operable to communicate a liquid into the annular liquid passage and the annular gas passage operable to communicate a gas into the annular fuel gas passage,
    wherein the annular fuel gas passage includes a multiple of exits,
    wherein each of the multiple of exits is at least partially defined by a vane within the annular fuel gas passage,
    wherein the annular fuel gas passage annularly extends about the axis from the annular gas passage to the multiple of exits and the annular liquid passage annularly extends about the axis from the tube to an opposing end of the annular liquid passage, and
    wherein the annular fuel gas passage extends between a first passage end at the annular gas passage and a second passage end opposite the first passage end, the second passage end being a distal end of the annular fuel gas passage, and wherein the multiple of exits form at least a portion of the second passage end and are disposed between and configured to fluidly connect the annular fuel gas passage and a combustion chamber of the combustor.

2. The fuel nozzle as recited in claim 1, wherein the multiple of exits are located through a ramped portion of the radially innermost wall of the outer air swirler.

3. The fuel nozzle as recited in claim 1, wherein the air inflow tube defines a central air passage.

4. The fuel nozzle as recited in claim 3, further comprising a helical inflow vane within the air inflow tube.

5. The fuel nozzle as recited in claim 1, wherein the annular fuel gas passage communicates about one hundred percent of the gas through the multiple of exits.

6. The fuel nozzle as recited in claim 1, wherein the tube is secured within the housing with a seal at a first end section and at a second end section via one of a braze, weld, or threaded attachment.

7. The fuel nozzle as recited in claim 6, wherein the seal is an O-ring seal, and wherein the second end section is opposed to the first end section.

8. The fuel nozzle of claim 1, wherein a radially outermost wall of the outer air swirler extends axially past the radially outermost wall of the inner air swirler in a downstream direction and the radially outer wall of the inner air swirler extends axially past the air inflow tube in the downstream direction.

9. The fuel nozzle of claim 8, wherein an end section of the radially outermost wall of the outer air swirler and an end section of the radially outermost wall of the inner air swirler are oriented radially inward toward the axis.

10. The fuel nozzle of claim 1, wherein the vane extends from an end section of the radially innermost wall of the outer air swirler.

11. The fuel nozzle of claim 1, wherein the vane is part of a plurality of vanes disposed within the annular fuel gas passage and extending between and connecting an inner radial surface and an outer radial surface of the annular fuel gas passage, each vane of the plurality of vanes circumferentially spaced from each adjacent vane of the plurality of vanes and defining an exit of the multiple of exits between each vane and each adjacent vane.

12. A fuel nozzle for a combustor of a gas turbine engine, comprising:
    an outer air swirler along an axis, the outer air swirler defines an outer annular air passage; and
    an inner air swirler along the axis to define an annular fuel gas passage around the axis, the annular fuel gas passage further defined, at least in part, by a surface of a radially innermost wall of the outer air swirler and a surface of a radially outermost wall of the inner air swirler, wherein an annular liquid passage around the axis is defined, at least in part, by another surface of the radially outermost wall of the inner air swirler and an air inflow tube, and the annular fuel gas passage includes a multiple of exits, wherein each of the multiple of exits is at least partially defined by a vane within the annular fuel gas passage, wherein each vane is defined by an airfoil wall surface between a leading edge and a trailing edge to define a concave shaped portion to form a pressure side and a convex shaped portion to form a suction side, wherein each vane is angled with respect to the axis by an angle between fifty and sixty degrees such that the trailing edge, the outer air swirler, and the inner air swirler form a skewed quadrilateral, wherein the annular fuel gas passage annularly extends about the axis from an annular gas passage to the multiple of exits and the annular liquid passage annularly extends about the axis from a tube to an opposing end of the annular liquid passage, and wherein the annular fuel gas passage extends between a first passage end at the annular gas passage and a second passage end opposite the first passage end, the second passage end being a distal end of the annular fuel gas passage, and wherein the multiple of exits form at least a portion of the second passage end and are disposed between and configured to fluidly connect the annular fuel gas passage and a combustion chamber of the combustor.

13. The fuel nozzle as recited in claim 12, wherein the tube is disposed within a housing to define the annular gas passage around the tube, wherein the tube is operable to communicate a liquid into the annular liquid passage and the annular gas passage is operable to communicate a gas into the annular fuel gas passage.

14. The fuel nozzle as recited in claim 12, wherein the multiple of exits are located through a ramped portion of the radially innermost wall of the outer air swirler.

15. The fuel nozzle as recited in claim 12, wherein the annular fuel gas passage communicates about one hundred percent of the gas through the multiple of exits.

16. A method of directing a fuel gas and a liquid through a fuel nozzle and into a combustor of a gas turbine engine, the method comprising:
  directing an airflow through an outer annular air passage around an axis;
  directing the fuel gas through an annular fuel gas passage around the axis and radially within the outer annular air passage;
  directing the liquid though an annular liquid passage around the axis and radially within the annular fuel gas passage; and
  directing the fuel gas through a multiple of exits;
  wherein each of the multiple of exits is at least partially defined by a vane within the annular fuel gas passage,
  wherein each vane is defined by an airfoil wall surface between a leading edge and a trailing edge to define a concave shaped portion to form a pressure side and a convex shaped portion to form a suction side,
  wherein each vane is angled with respect to the axis by an angle between fifty and sixty degrees such that the trailing edge, the outer air swirler, and the inner air swirler form a skewed quadrilateral,
  wherein a tube within a housing defines an annular gas passage around the tube, the tube in communication with the annular liquid passage and the annular gas passage in communication with the annular fuel gas passage,
  wherein the annular fuel gas passage annularly extends about the axis from the annular gas passage to the multiple of exits and the annular liquid passage annularly extends about the axis from the tube to an opposing end of the annular liquid passage, and
  wherein the annular fuel gas passage extends between a first passage end at the annular gas passage and a second passage end opposite the first passage end, the second passage end being a distal end of the annular fuel gas passage, and wherein the multiple of exits form at least a portion of the second passage end and are disposed between and configured to fluidly connect the annular fuel gas passage and a combustion chamber of the combustor.

17. The method as recited in claim 16, further comprising:
  directing an airflow through a central passage radially within the annular liquid passage; and
  swirling the airflow within the central passage.

18. The method as recited in claim 16, further comprising directing the liquid into the annular liquid passage through the tube shielded by the fuel gas in communication with the annular fuel gas passage.

* * * * *